United States Patent
Ait Bouziad (10) Patent No.: US 11,638,442 B2
(45) Date of Patent: May 2, 2023

(54) FOOD PROCESSING SYSTEM AND ASSOCIATED METHOD

(71) Applicant: NESTEC S.A., Vevey (CH)

(72) Inventor: Youcef Ait Bouziad, Echandens (CH)

(73) Assignee: Societe des Produits Nestle S.A., Vevey (CH)

( * ) Notice: Subject to any disclaimer, the term of this patent is extended or adjusted under 35 U.S.C. 154(b) by 77 days.

(21) Appl. No.: 16/344,470

(22) PCT Filed: Oct. 23, 2017

(86) PCT No.: PCT/EP2017/076944
§ 371 (c)(1),
(2) Date: Apr. 24, 2019

(87) PCT Pub. No.: WO2018/082950
PCT Pub. Date: May 11, 2018

(65) Prior Publication Data
US 2019/0335801 A1 Nov. 7, 2019

(30) Foreign Application Priority Data
Nov. 1, 2016 (EP) .................................. 16196742

(51) Int. Cl.
*A23P 30/20* (2016.01)
*A23P 20/20* (2016.01)
(Continued)

(52) U.S. Cl.
CPC ................. *A23P 30/20* (2016.08); *A23L 5/55* (2016.08); *A23P 20/20* (2016.08); *A23P 2020/253* (2016.08); *A23V 2002/00* (2013.01)

(58) Field of Classification Search
CPC .... A23P 30/20; A23P 20/20; A23P 2020/253; A23L 5/55; A23V 2002/00
See application file for complete search history.

(56) References Cited

U.S. PATENT DOCUMENTS

| 1,790,347 A * | 1/1931 | Hawkins .............. A21C 1/1435 |
| | | 366/165.3 |
| 2,896,556 A * | 7/1959 | Sippel ...................... A21C 1/00 |
| | | 366/76.3 |
| 3,458,321 A * | 7/1969 | Stephenson ............. A23P 30/20 |
| | | 99/324 |

(Continued)

FOREIGN PATENT DOCUMENTS

| CN | 103932368 A | 7/2014 |
| CN | 104642684 A * | 5/2015 ................ A23P 1/08 |

(Continued)

OTHER PUBLICATIONS

Chinese Office Action for Appl No. 201780066702.1 dated Dec. 2, 2020.

*Primary Examiner* — Steven N Leff
(74) *Attorney, Agent, or Firm* — K&L Gates LLP (57) ABSTRACT

The invention relates to a food processing system (100) allowing reconstitution and/or structuration and/or texturization of dehydrated food materials such as powders, the system comprising: —a dosing system (50) comprising one or a plurality of containers (20) each container comprising a dehydrated or partially dehydrated food material; —at least one reconstitution food processing unit (10) to which the containers (20) from the dosing system can be connected, the processing unit (10) comprising: at least one product inlet (17) for the food material coming from a container (20), at least one liquid inlet (18) for liquid to be mixed with the food material, and at least one product outlet (16) at one end of the unit (10) for in-line depositing the formed food; —a depositing area (60) where the formed food from the processing unit (10) is dispensed; the depositing area (60) and the at least one food processing unit (10) being moveable with respect to each other in such a way that different food shapes and/or patterns from one or different food materials (Continued)

can be formed in the depositing area (60). The invention further relates to a method for operating a food processing system (100) as the one described.

20 Claims, 12 Drawing Sheets

(51) Int. Cl.
    *A23L 5/00*     (2016.01)
    *A23P 20/25*     (2016.01)

(56) References Cited

U.S. PATENT DOCUMENTS

| | | | | |
|---|---|---|---|---|
| 4,352,576 A | * | 10/1982 | Hori | B41J 23/04 |
| | | | | 101/93.17 |
| 4,473,299 A | * | 9/1984 | Guibert | A21C 1/06 |
| | | | | 366/156.2 |
| 4,490,046 A | * | 12/1984 | Guibert | B01F 7/24 |
| | | | | 366/297 |
| 6,280,785 B1 | | 8/2001 | Yang et al. | |
| 2004/0037926 A1 | * | 2/2004 | Akimoto | A23G 1/203 |
| | | | | 426/94 |
| 2012/0089238 A1 | | 4/2012 | Kang et al. | |
| 2013/0034633 A1 | * | 2/2013 | von Hasseln | B33Y 10/00 |
| | | | | 426/104 |

FOREIGN PATENT DOCUMENTS

| | | | | |
|---|---|---|---|---|
| CN | 104824301 A | * | 8/2015 | ............ A23P 1/08 |
| CN | 204547080 U | | 8/2015 | |
| CN | 104959604 A | | 10/2015 | |
| CN | 104985814 A | | 10/2015 | |
| CN | 205364557 U | | 7/2016 | |
| KR | 20150126120 A | * | 11/2015 | ............ B29C 31/00 |
| WO | 2014190168 | | 11/2014 | |
| WO | 2014190217 | | 11/2014 | |

* cited by examiner

ND ASSOCIATED METHOD

FOOD PROCESSING SYSTEM AND ASSOCIATED METHOD

CROSS REFERENCE TO RELATED APPLICATIONS

The present application is a National Stage of International Application No. PCT/EP2017/076944, filed on Oct. 23, 2017, which claims priority to European Patent Application No. 16196742.7, filed on Nov. 1, 2016, the entire contents of which are being incorporated herein by reference.

FIELD OF THE INVENTION

The present invention is directed to a food processing system, particularly based on extrusion, reconstituting rehydrated food from dehydrated food material, typically powder. The invention further relates to a method for operating such a system.

BACKGROUND OF THE INVENTION

At present, several methods for producing different extruded food products are known. The food industry typically uses extrusion machines or extruders to produce textured edible products: in food applications, screw extrusion is predominant, typically consisting in either a single screw or twin screws encased in a barrel, through which the food product is conveyed and treated. A hopper arranged at one end is used to feed raw material, while a die on the other end gives shape to the product. A liquid, typically water, can also be added in the path of the extrusion machine.

Extrusion processing of food materials has become an increasingly important manufacturing method, with broader applications in the last decades. Extrusion processing combines a plurality of processes, such as transport, fluid flow, heat and mass transfer, mixing, shearing, particle size reduction, melting, texturizing, shaping and/or forming. Depending upon the product, one or a plurality of these (or other) processes will take place in an extruder. Extrusion is advantageously used in food manufacturing as it is a continuous process, where the same extruder can be used to manufacture different types of products. Extrusion processing is nowadays used in a variety of applications, such as for example the manufacture of breakfast cereals, pasta, meat analogs, filled snack products and pet food; the main parameters to control depending on the product made are shear level, temperature and moisture level.

However, even when the applications of extrusion technology in food processing and manufacturing have broadened over the last years, the science and fundamental understanding of the process has not developped at the same pace. In fact, complexity of nature of food materials combined with complex structures and geometries of screw and die geometries make extrussion processes extremely complex and not predictable.

Known food extrusion systems start from dehydrated material, such as powders, and comprise two parallel screws, with a certain controlled distance and pitch between them, such that the material is forced to flow through them, passing through certain controlled conditions in order to mix and reconstitute, when water is added. At the end, the product is typically conveyed through a die, where it is optionally cooled down and texturized. However, the problem of these known systems is that they have a complex configuration not allowing an easy extrusion of diverse food materials in certain different structures, i.e. they are not easily adaptable to the manufacturing of different food products, meaning that they are configured for certain products and being provided with an industrial complex and specific configuration.

It is known in the state of the art, for example as shown in US 2010/0136201 A1, a method for making extruded food products, where the components are introduced in an extruder to be mixed and heated, and further extruded through an extrusion die, being cooled before being finally delivered. The product is typically texturized having the appearance of a fibrous meat. However, the food products obtained are consistently the same and the method disclosed works in continuous, with similar input products fed to the line to be extruded in a final food product. Moreover, the method in this document is mainly intended for industrial use.

The present invention aims at providing an extrusion food processing system on demand, simple in configuration but yet allowing diversity both in materials and in configuration of the food products manufactured, solving the above-described problems in the existing prior art, as it will be also further explained. The invention also aims at other objects and particularly the solution of other problems as will appear in the rest of the present description.

OBJECT AND SUMMARY OF THE INVENTION

According to a first aspect, the invention relates to a food processing system 100 allowing reconstitution and/or structuration and/or texturization of dehydrated food materials such as powders. The system comprises: a dosing system 50 comprising one or a plurality of containers 20, each container comprising a dehydrated or partially dehydrated food material; at least one reconstitution food processing unit 10 to which the containers 20 from the dosing system can be connected, the processing unit 10 comprising at least one product inlet 17 for the food material coming from a container 20, at least one liquid inlet 18 for liquid to be mixed with the food material, and at least one product outlet 16 at one end of the unit 10 for in-line depositing the formed food; a depositing area 60 where the formed food from the processing unit 10 is dispensed. In the system of the invention, the depositing area 60 and the at least one food processing unit 10 are moveable with respect to each other in such a way that different food shapes and/or patterns from one or different food materials can be formed in the depositing area 60.

In the food processing system of the invention, preferably the at least one reconstitution food processing unit 10 and/or the depositing area 60 are relatively moveable in axis X and/or Y and/or Z and/or are relatively rotatable in Theta.

Typically, different containers 20 are interchangeable in the reconstitution food processing unit 10 in the food processing system of the invention so as to deposit one or a plurality of layers and/or patterns of the same or different food materials in the depositing area 60.

The food processing system of the invention preferably further comprises cooking means that can be selectively activated in order to heat and/or cook at least part of the food patterns deposited in the depositing area 60. The cooking means can be attached to the at least one reconstitution food processing unit 10, according to a possible embodiment, or they can be independently moveable from the reconstitution food processing unit 10.

In the food processing system of the invention, the processing unit 10 typically further comprises heating means allowing heating one or a plurality of pre-defined areas in the processing unit 10 to pre-heat the deposited food material.

Preferably, the processing unit 10 comprises at least a heating area to influence and/or modify the food material structure. Also preferably, the processing unit 10 comprises at least a cooling area arranged after the heating area where the material structure is established and aligned to the shape of the outlet 16, the outlet being configured as a die.

In the food processing system of the invention the processing speed/rate of the processing unit 10 and/or the product flow rate and/or the liquid flow rate in the processing unit 10 and/or the product temperature are independently controllable to generate different hydration levels and/or food material structures and/or textures of the food product deposited.

Preferably, the reconstitution food processing unit in the system of the invention is an extrusion unit. Typically, the extrusion unit comprises two parallel screws 12 configuring one or a plurality of segments with different profiles designed to achieve different functions such as shear generation and/or mixing and/or aeration, and to thrust the product flowing through them. Also preferably, the extrusion unit comprises on one end a segment 120 avoiding backflow of the product.

In the food processing system of the invention, the liquid inlet 18 is typically arranged after the product inlet 17 with respect to the product path in the processing unit 10.

In one embodiment of the invention, the liquid introduced through the liquid inlet 18 has been previously heated.

It is also possible that the food processing system of the invention further comprises a secondary liquid inlet 19 close to the outlet 16.

Typically, the containers 20 in the dosing system of the food processing system of the invention, comprise identification means with information on the ingredient delivered to the processing unit 10.

The food processing system of the present invention preferably further comprises control means managing the container or containers 20 to be connected to the processing unit 10 so as to deliver different food patterns in the shape of layers of the same or different food materials on the depositing area 60 according to a certain pre-defined recipe in a database or in a control unit.

According to a second aspect, the invention further relates to a method for operating a food processing system 100 as the one described, this method comprising the steps of:
- attaching one container 20 to the product inlet 17 to deliver a certain dehydrated food material into the processing unit 10;
- retrieving the information of the food material on the container 20 and the recipe from a database or a control unit to adapt process parameters in the processing unit 10 to deliver the hydration level and/or food material structure and/or texture desired for the food product;
- processing the dehydrated material in the unit 10 and delivering at least a layer of it into the depositing area 60.

Preferably, the method of the invention further comprises a step of changing the container 20 to a different one in order to dispense a further layer of the same or of a different food material, this step being repeated one or a plurality of successive times.

Typically, in the method of the invention, the layers of the product dispensed can be selectively heated and/or cooked by cooking means.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

Figure 11:
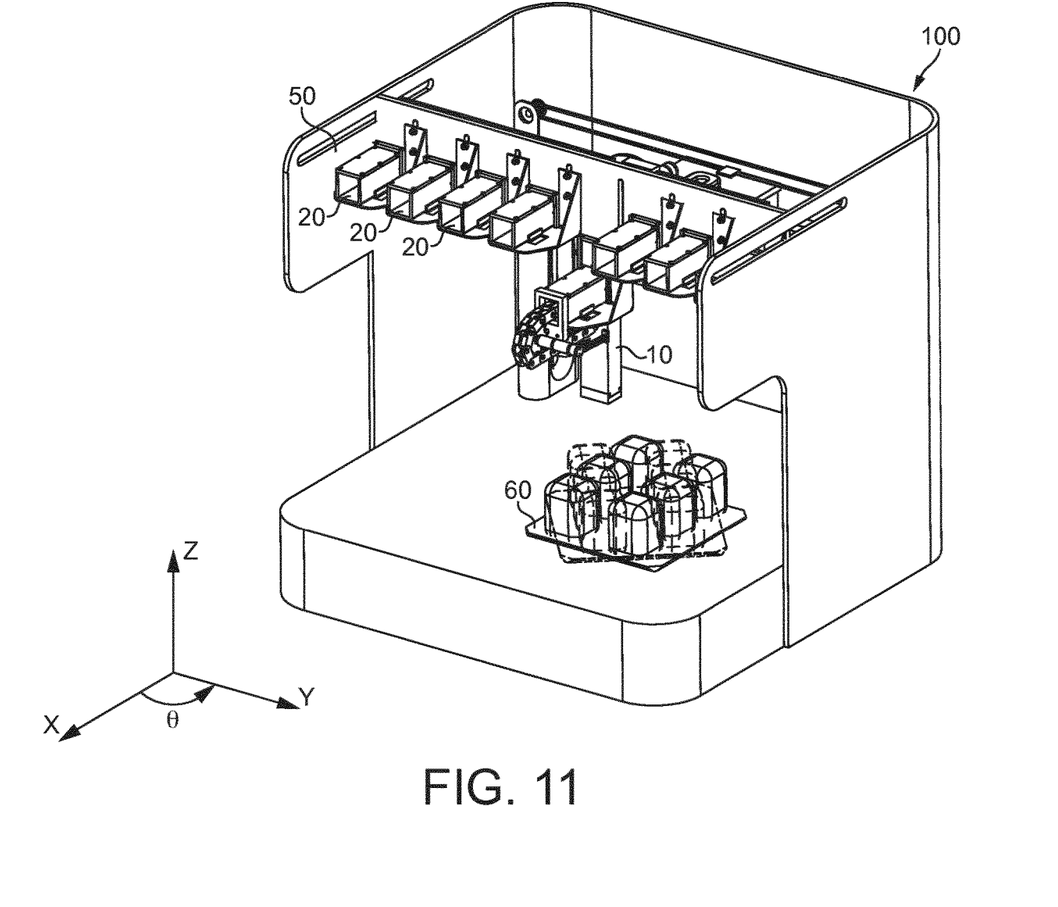
FIG. 11 shows a representative view of the main components in a food processing system according to the present invention.
Figure 12:
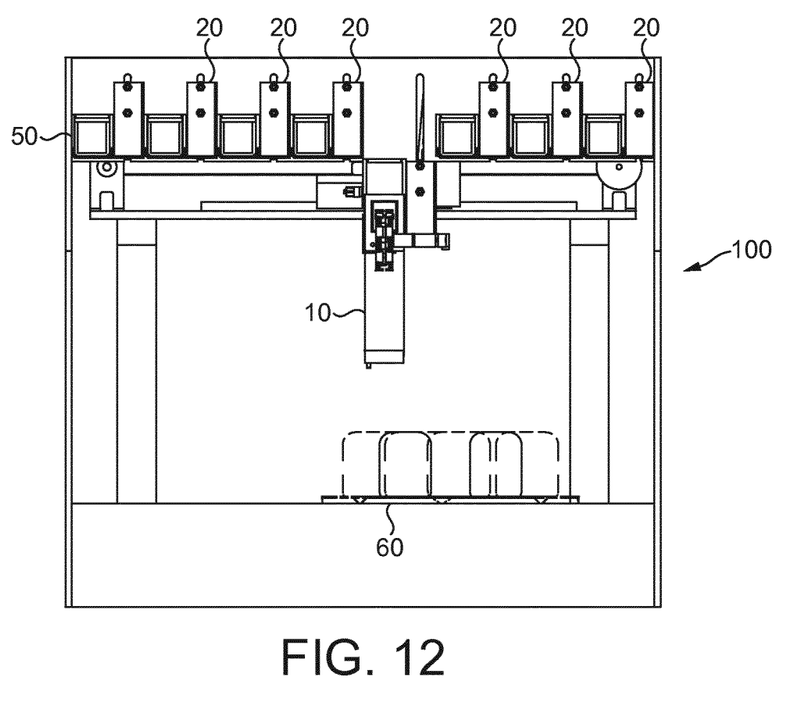
FIG. 12 shows a frontal view of the food processing system according to the present invention.

According to a first aspect, the invention relates to a food processing system 100, as schematically represented in FIG. 11 or 12, allowing reconstitution and/or structuration and/or texturization of dehydrated food materials, typically powders. When talking in what follows of dehydrated food materials, it should also be comprised within the scope and content of the present invention partially dehydrated food materials, with a certain water content.

By reconstitution it should be understood the addition of a liquid, typically water, to the initial powder, further mixing both and obtaining as a consequence a dough-type product. By structuration, the internal physical structure (food engineering or food matrixes) of the dough food material is changed and diverse food structures such as solutions, gels, foams, emulsions, etc. are obtained; the different structures can play a role in improving the consumer's digestion or in the sensorial improvement of sugar and/or fat reductions, as some examples. For obtaining different food structures, diverse physical and/or mechanical procedures can be applied, depending on the intended result, such as aeration, shearing, heating, cooling, etc. Finally, texturization refers to the perception received by the consumer, particularly the mouth feeling perception by the consumer, typically if the food product is soft, hard, crispy, crunchy, creamy, fibrous, elastic, foamy, etc. The food texture is highly dependent on the food structure and also on the rheological properties of food, that is, the fluidity and consistency degree of the food material, which typically determine the acceptability of the food products by the consumer.

The food processing system of the present invention is intended to reconstitute an initial powder, typically by addition of water and can also provide different structures and/or textures by the process followed by the food material in the so called reconstitution food processing unit 10 and/or in a later cooking process following deposition in the system 100, as it will be further explained in more detail.

Therefore, one of the main advantages of the invention is to use dehydrated materials (typically powders) as starting materials instead of using liquids, fluids or doughs as in the known prior art (the advantages of using powders are detailed in the paragraph below), but being able to provide at the same time a wide flexibility in the range of food material structures and/or textures provided, depending on the process followed by these powders in the system 100.

The system of the invention uses as starting food materials dehydrated food materials, such as powders. There are clear advantages for using dehydrated or partially dehydrated materials instead of using liquid materials or dough, such as:
- there is a longer shelf life at ambient temperature;
- as there is no water or fluid in the stored material, a same container of origin comprising powder can be used several times, that is, can be multi-serve (no water activity);
- multiple structures starting from powder are possible, from liquid to solid ones, such as for example gel, foam, etc., depending on the processing and on the liquid or fluid added;
- the packaging requires less space, so it is more compact; and
- different textures (like inclusions or fibres for example) are possible in the powder structure.

Referring to any of FIG. 11 or 12, the food processing system 100 of the invention comprises the following:
- a dosing system 50 comprising one or a plurality of containers 20, where each container comprises the same or different dehydrated food material;
- at least one reconstitution food processing unit 10 to which the containers 20 from the dosing system 50 can be connected, so that the powder is mixed with a liquid, typically water, the powder being processed in different ways depending on the intended final food structure and/or texture, and is later deposited;
- a depositing area 60 where the formed food from the processing unit 10 is dispensed.

In the system 100 of the invention, there is a dosing system 50 comprising typically a plurality of containers 20, each container comprising a different dehydrated food material, typically a powder. The containers can also comprise certain inclusions or fibres together with the powder material, so that specific fibrous textures for example are provided in the food material. Depending on the recipe of the product to be prepared in the system, different containers 20 will be successively plugged to the reconstitution food processing unit 10, so that diverse successive patterns or layers of different or the same food material will be processed and deposited by the unit 10 on the depositing area 60.

Even when not shown in FIGS. 11-12, the system 100 will typically be provided with cooking means that can be selectively activated or not, to cook part or the complete food layers or patterns deposited in the area 60. Depending on the recipe, the cooking means will be activated or not, during a certain time, reaching a certain temperature, etc. Typically, the cooking means will comprise surface cooking means and core cooking means. The surface cooking means will typically be selected from: a broiler element, hot air convection and/or infrared radiation means with adequate wavelength. The broiler element and the hot air convection preferably heat the cavity and the surface of the medium, whereas the infrared radiation means are more localized and heat the surface of the medium only. For core cooking means, the present invention will typically use infrared radiation means at appropriate wavelength and/or microwave means, either using a magnetron or solid state microwaves.

The cooking means can be attached to the reconstitution food processing unit 10 so that they can cook the deposited food material substantially at the same time as it has been deposited on the area 60, or these cooking means can be independently moveable from the reconstitution food processing unit 10, so they will typically cook the food material after it has been deposited.

The containers 20 in the dosing system 50 can comprise identification means (typically a code) with information on the ingredients comprised inside. Furthermore, the system 100 of the invention is provided with a control unit managing the dosing system 50 and the containers 20 to be plugged to the processing unit 10 at each time, depending on a certain recipe to produce a certain edible final food product: this recipe is either comprised in a database or is downloaded from a cloud or is directly comprised in the control unit itself. To obtain a certain recipe, the control unit will manage the container or containers to plug to the processing unit 10 at each time, the type of pattern or layer to deliver on the area 60 (therefore also providing the processing unit 10 with the processing parameters inside of it, as it will be explained) and the cooking parameters the cooking means shall apply.

The system of the invention is configured in such a way that allows either the processing unit 10 or the depositing area 60 or both move with respect to each other, in such a way that different shapes or patterns of food can be deposited and built in the depositing area 60. In an embodiment of the invention, the system will be provided with a processing unit 10 that will be fix, while the depositing area 60 will be able to move in X and/or Y and/or Z, allowing any possible configuration of deposited food materials in 3-dimensions on the depositing area 60. Another possible embodiment of the invention will allow the processing unit 10 move horizontally in Y (see FIG. 11) while the depositing area 60 will be able to move vertically in Z and will be able to rotate in the plane XY an angle $\theta$. The combination of these three movements allows the deposition of any 3-dimensions shape on the area 60. In general, according to the invention, any possible relative combination of movements of the depositing area 60 and the processing unit 10 (in X, Y, Z and angle $\theta$) will be possible in order to allow building the 3-dimension structures of food products on the depositing area 60. Depending on how compact the system is, the relative movements of the two will be adjusted.

Referring now to FIGS. 1-10, a first embodiment of the food processing unit 10 is shown in FIGS. 1-5, while a second embodiment of the unit 10 is represented in FIGS. 6-10.

According to either the first or the second embodiment of the invention, the food processing unit 10 is configured as an extrusion unit, comprising two parallel screws 12 typically rotating in the same direction. The screws 12 are made rotate by means of gears 121 (actioned by a motor, not shown), preferably cylindrical spur gears arranged at two heights. Each screw comprises an axis with several different sections and geometries configuring different profiles such that the two screws together configure diverse sections providing different mixing effects to the product flowing through them. The processing unit comprises on the top part at least a product inlet 17 through which the powder coming from the corresponding plugged container 20 enters and flows through the screws 12. Shortly after the product inlet 17, the processing unit 10 is further provided with a primary liquid inlet 18, typically adding water in the interstices between the screws 12 in order to mix and reconstitute the powder introduced through the inlet 17. The liquid inlet 18 is arranged after the product inlet 17 with respect to the product path in the processing unit 10. Optionally, the liquid introduced through the liquid inlet 18 can have been previously heated.

The different profiles in the screws 12 configuring different areas are designed to achieve different functions such as shear generation and/or mixing and/or aeration, and to thrust the product flowing through them. Additionally, the different effects intended (mixing level, aeration, shear, etc.) are achieved by acting on the process parameters in the processing unit 10, such as the processing speed/rate of the screws 12 and/or the product flow rate and/or the liquid flow rate in the processing unit 10 and/or the product temperature. These parameters will typically be independently controllable to generate different hydration levels and/or textures of the food product deposited. As already described, the texture and/or structure of the food product will be also determined by the later cooking process followed in the system.

Figure 1:
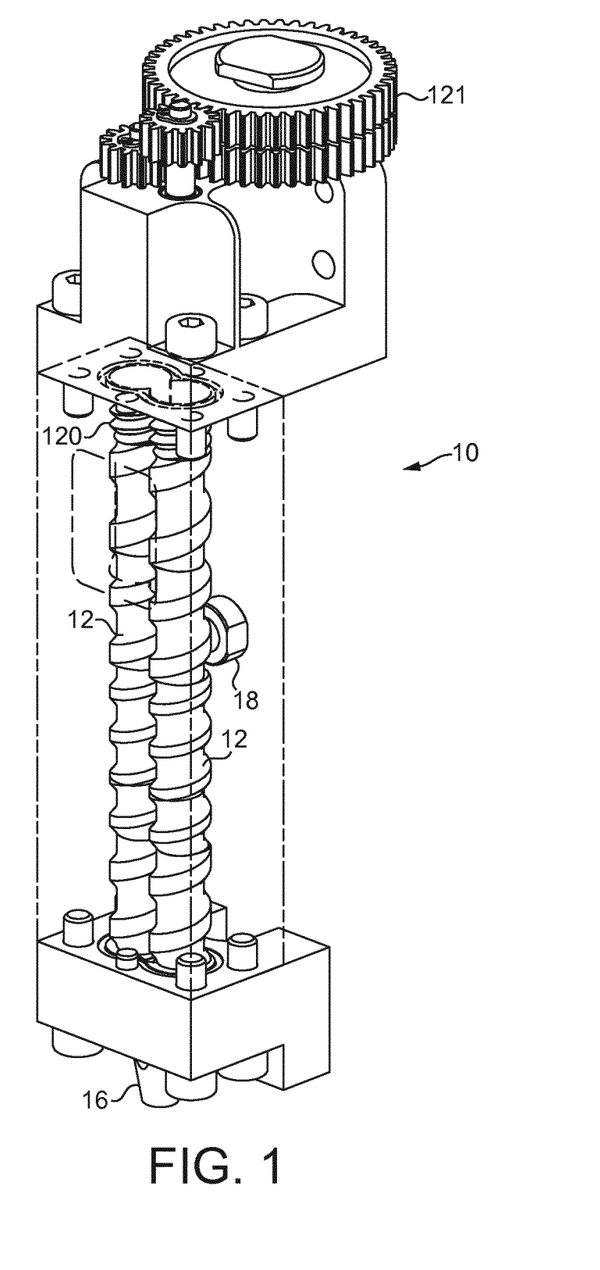
FIGS. 1-2 show representative views of a reconstitution food processing unit, according to a first embodiment, in a food processing system according to the present invention.
Figure 2:
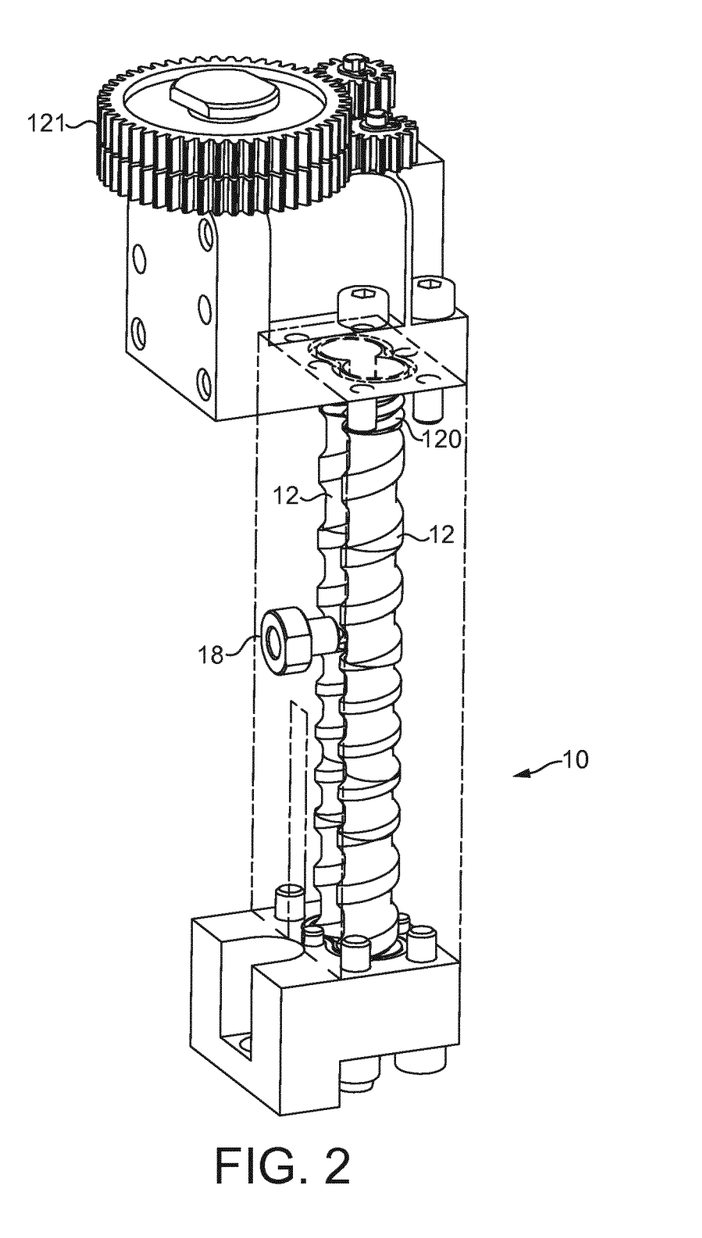
Figure 3:
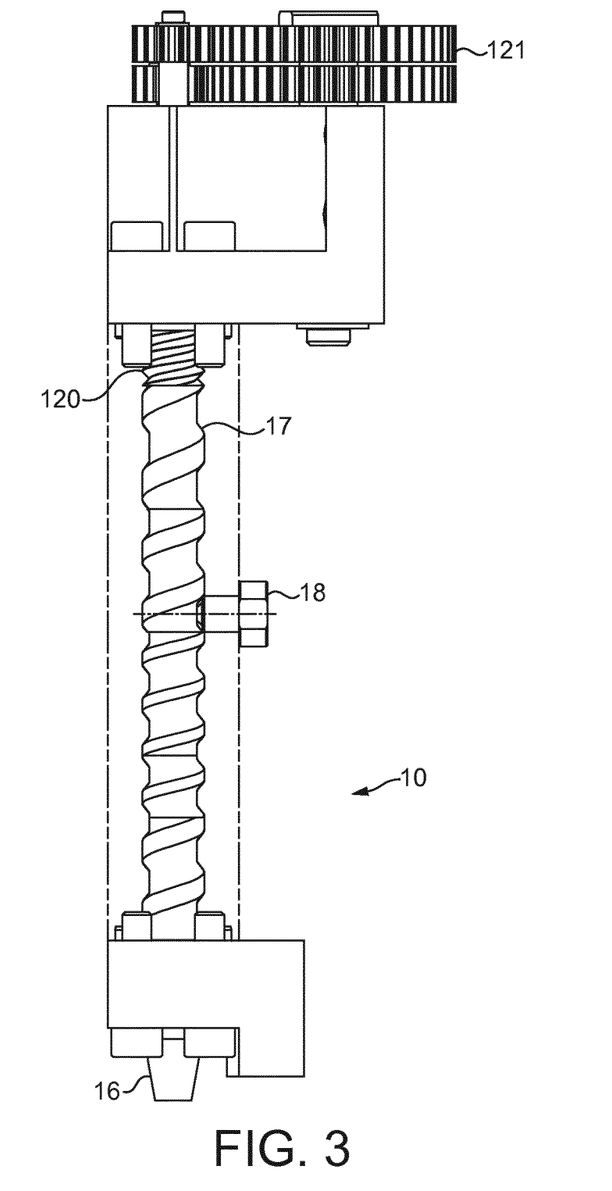
FIG. 3 shows a side view of a reconstitution food processing unit, according to a first embodiment, in a food processing system according to the present invention.
Figure 4:
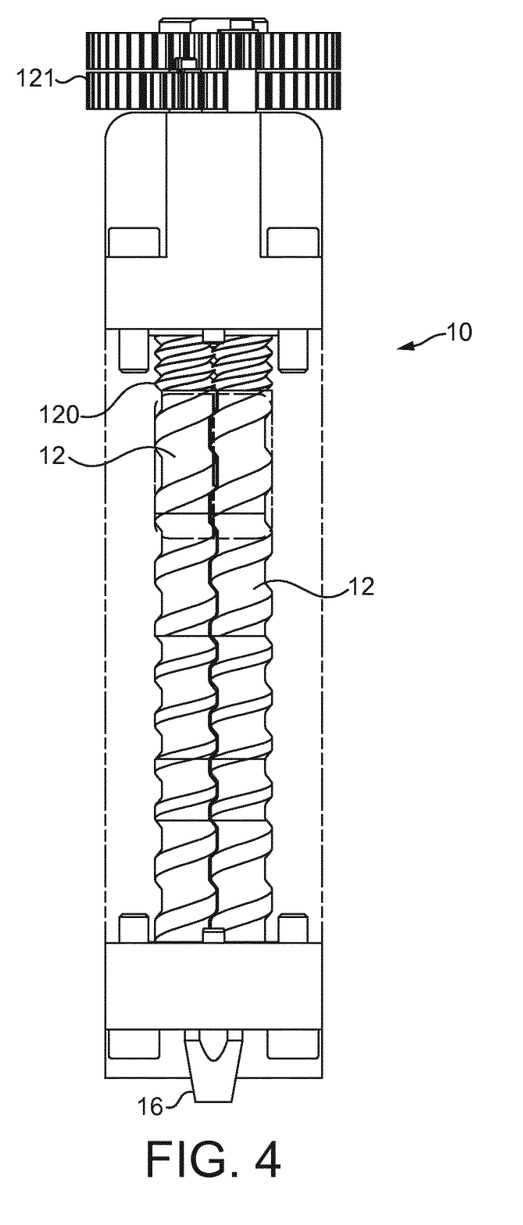
FIG. 4 shows a rear view of a reconstitution food processing unit, according to a first embodiment, in a food processing system according to the present invention.
Figure 5:
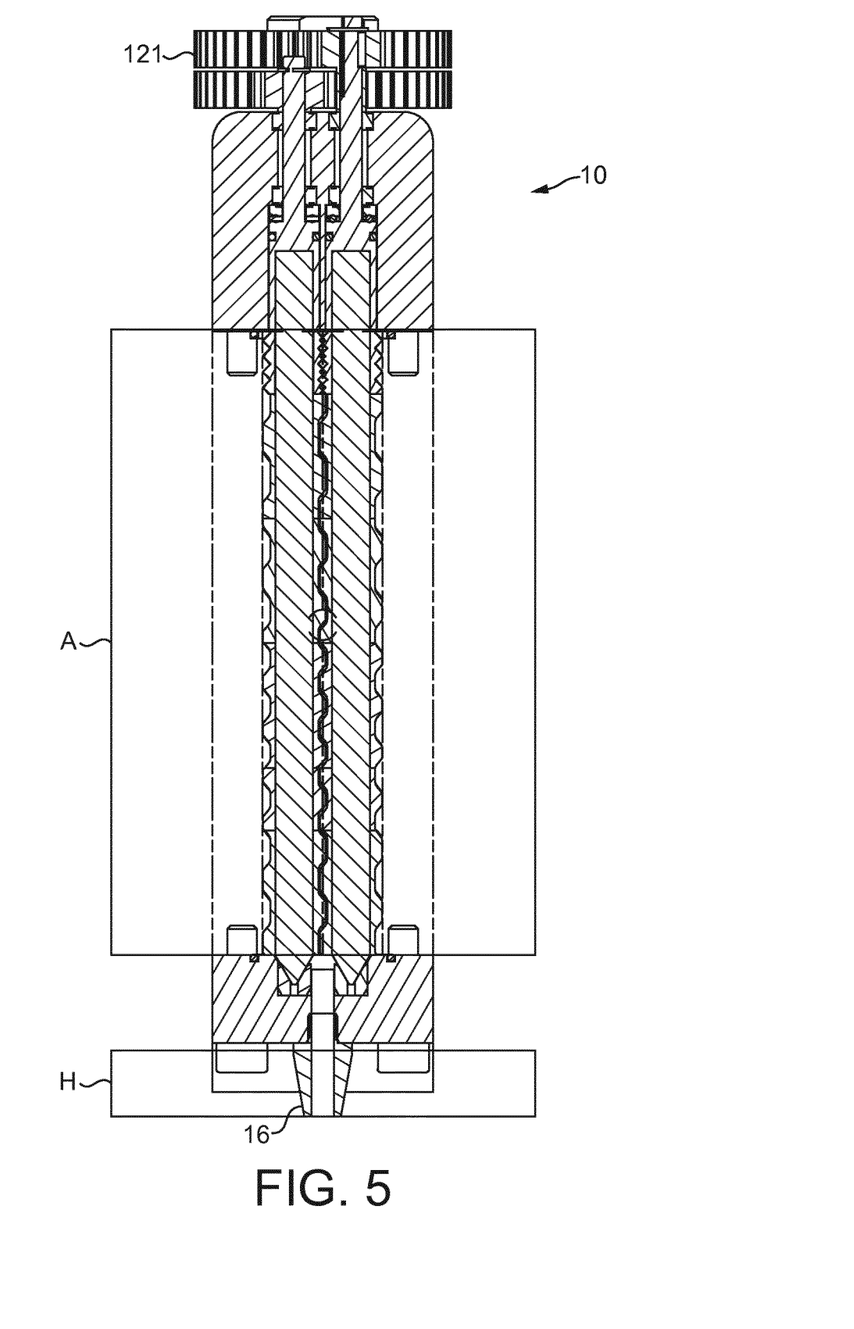
FIG. 5 shows a schematic sectional view showing the different processing areas in a reconstitution food processing unit, according to a first embodiment, in a food processing system according to the present invention.
Figure 6:
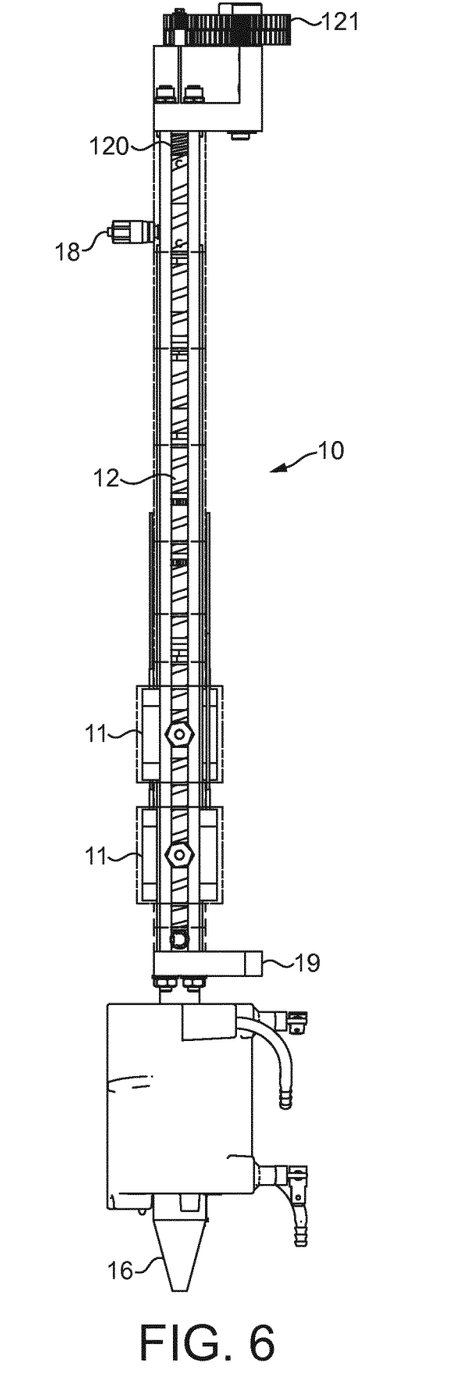
FIG. 6 shows a side view of a reconstitution food processing unit, according to a second embodiment, in a food processing system according to the present invention.
Figure 7:
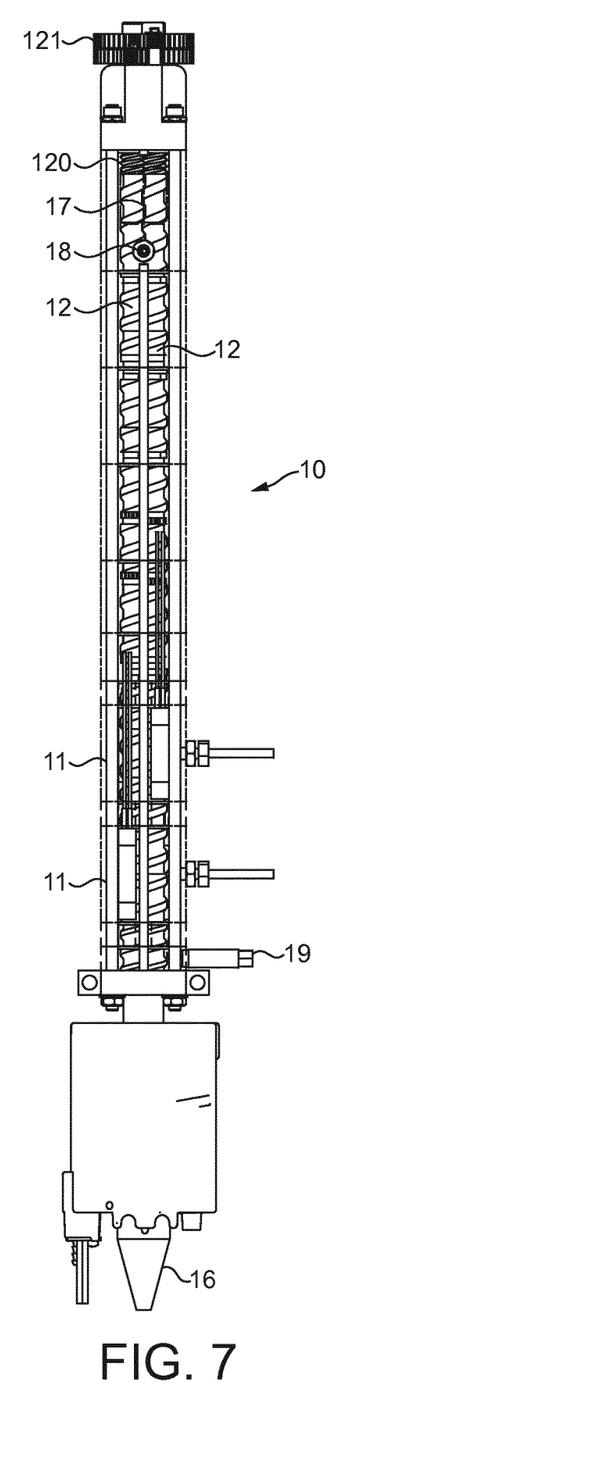
FIG. 7 shows a frontal view of a reconstitution food processing unit, according to a second embodiment, in a food processing system according to the present invention.

The top part of the screws 12 configures an anti-backflow port 120 preventing the backflow to the product inlet 17, as it can be seen in FIGS. 1, 2, 3 (first embodiment) or in FIG. 6 or 7 (second embodiment).

FIGS. 1 to 5 show a first embodiment of the food processing unit 10 used in a system 100 according to the present invention. The processing unit 10 comprises an extrusion unit with two parallel screws 12, moved by gears 121 actioned by a motor (not shown). The dehydrated or partially dehydrated product, typically powder (possibly also comprising certain fibres) is introduced in the space between the screws 12 through a product inlet 17. A liquid (typically water) is introduced through a liquid inlet 18, located after the inlet 17 in the extrusion path. The processing unit 10 in this first embodiment can comprise also (optionally) a heating area arranged integrated in the external path of the rotating screws 12: the aim is to heat the food product flowing through it to a temperature below its cooking temperature in order to improve mixing and to save time when the product is deposited in the area 60 and has to be cooked afterwards (i.e. the product is pre-heated), as it is provided already to a certain temperature, so the gradient to reach towards the product cooking temperature is lower. Though not represented in the Figures, a secondary liquid inlet 19 through which a liquid (typically lubricant or aromas or spices) is added before the product flows in the outlet 16 for being deposited on the depositing area 60 is also possible according to this embodiment of the invention. The food product in the unit 10 of the first embodiment is reconstituted by being mixed with water and is later conveyed and deposited through the outlet 16. Therefore, referring to FIG. 5, the processing unit 10 comprises two areas or zones: a conveying and mixing zone A, which can also be optionally externally heated, and a forming zone (outlet) H.

Figure 8:
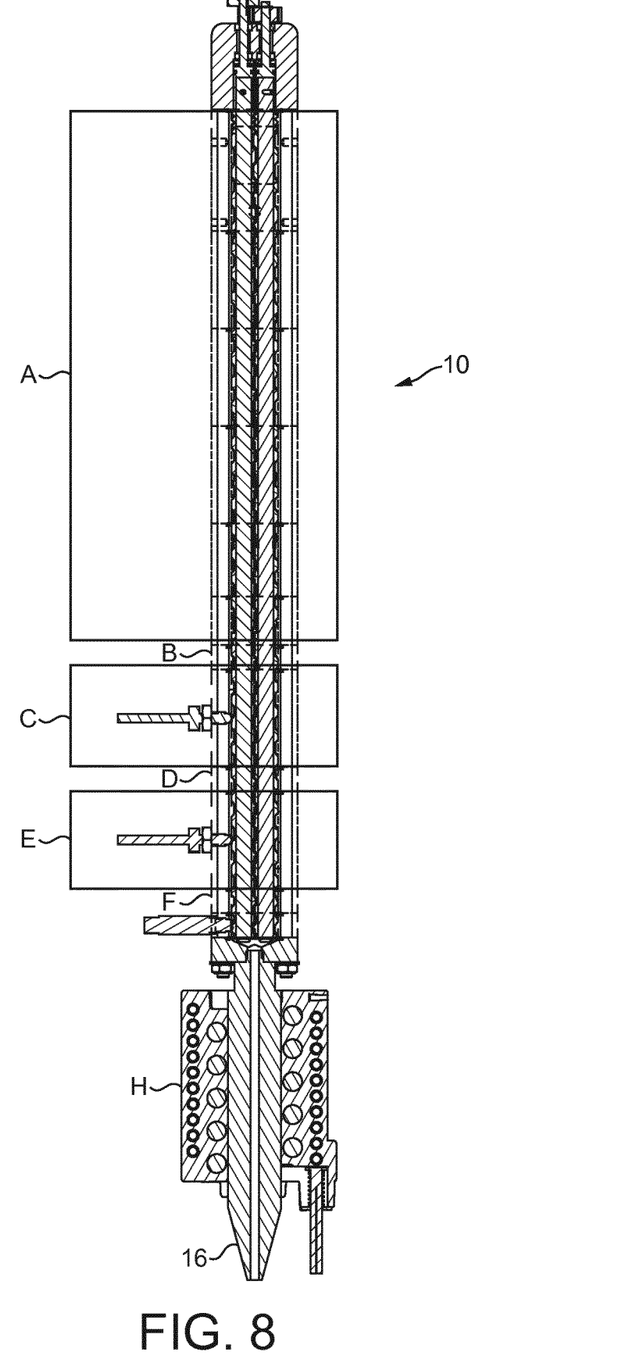
FIG. 8 shows a schematic sectional view showing the different processing areas in a reconstitution food processing unit according to a second embodiment in a food processing system according to the present invention.
Figure 9:
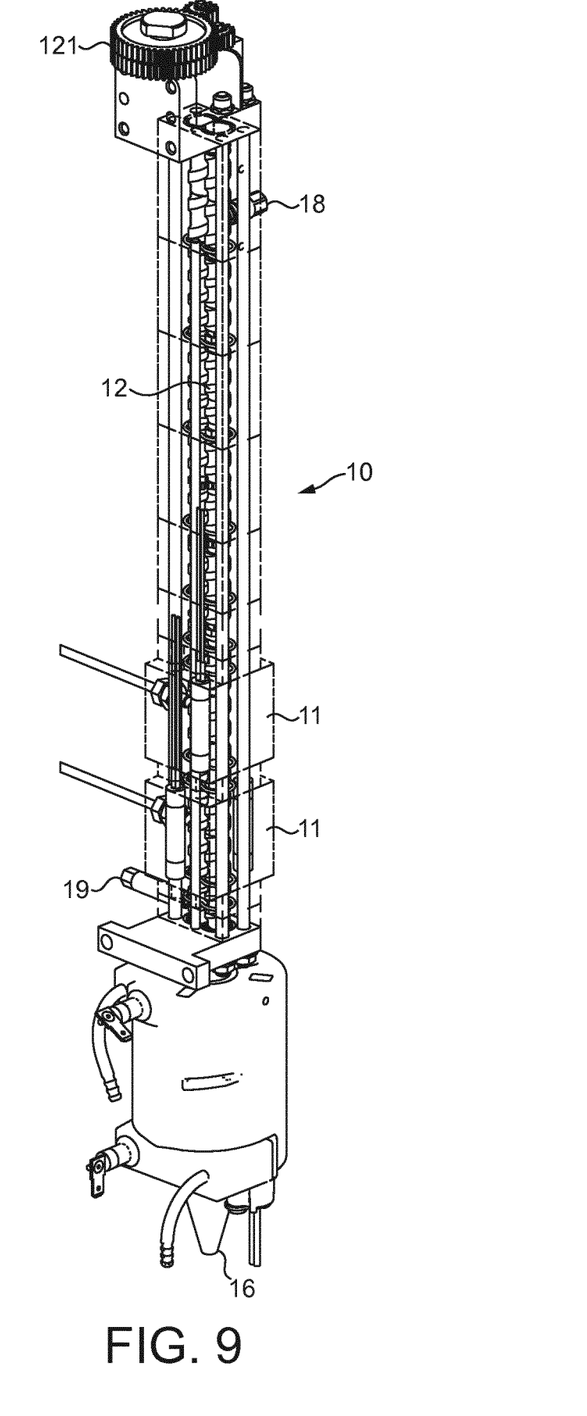
FIGS. 9-10 show representative views of a reconstitution food processing unit, according to a second embodiment, in a food processing system according to the present invention.
Figure 10:
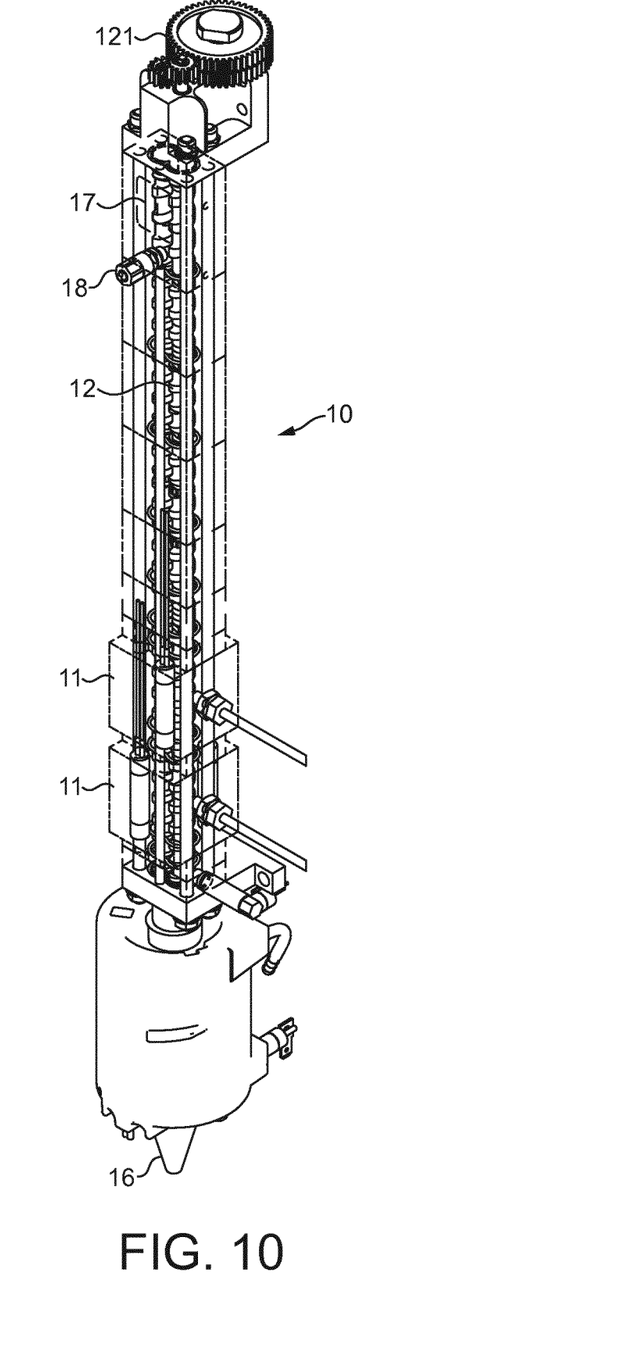

According to the second embodiment, and referring for example to FIG. 8, different areas providing different effects in the unit 10 are shown. A first area A is represented, intended for mixing powder and water and for conveying such mixture through the unit 10. The processing unit 10 further comprises at least a heating area, preferably two heating areas or zones C and E, typically up to temperatures of 240° C., where the food material structure is influenced and/or modified. Preferably, each zone C and E will be independently controlled. Arranged between the heating areas, there are also thermal isolating areas or zones arranged, as represented by references B, D or F in the mentioned FIG. 8, typically allowing this independent control. Later in the unit 10 the prepared food product is conveyed towards the outlet 16 of the processing unit 10 where optionally, a secondary liquid inlet 19 can be provided: the liquid introduced through this inlet 19 will be a lubricant, to improve the conveying and further dispensing of the product, such as for example oil, or an aroma or spices or the like. Finally, the processing unit 10 will comprise an outlet 16 at the end, typically shaped as a die: this will configure a final forming area H through which the product will flow and will be cooled down, its structure will be aligned and made stable, before being deposited on the area 60.

Typically, in the heating zones C and E, the food product is heated close to the outlet 16 before it is deposited onto the depositing area 60: in these heating areas, the food product is heated so as to be able to influence and modify its internal structure and/or texture and improve mixing. Later, when deposited in the area 60, the cooking means in the system 100 will cook the product if required according to the corresponding recipe to its cooking temperature.

In the first area A the powder will be reconstituted and mixed with the addition of liquid, typically water by being mechanically conveyed through the rotating screws 12. Later on, this mixture will be heated first to improve its mixing and secondly to destructure the initial food material structure (such as proteins) in order to provide the structure and/or texture pursued for the food material. Later, the food material will be directed towards the die or outlet 16: the food structure and its texture will be fixed by flowing inside the die, being cooled down before being deposited onto the depositing area 60 (FIG. 8 shows a sectional view of the cooling path in zone H in the die 16). Once the food layers or patterns deposited on this area 60 will be cooked, further modifications on the material structure and texture will be reached depending on the characteristics of the cooking procedure followed.

Typically, to obtain a foam structure, aeration and high shear shall be provided to the food product. For a gel, heating and later cooling down will be required, addition of dried pieces will provide a crunchy texture and specific final heating will make the product crispy.

According to a second aspect, the invention further relates to a method for operating a food processing system 100 as the one described. In the method of the invention, the control unit gets the information on a certain recipe of product to be prepared in the system 100, and manages the functioning of the system accordingly: the containers 20 to plug to the processing unit 10, the parameters in the processing unit (speed, flow of product, flow of liquid, temperature, quantity disposed) for each product processed (coming both from the product identification in the containers 20 and from the recipe), the patterns or layers to deposit on the depositing area 60 (this is typically done by the control of the relative movement of the area 60 and the unit 10) and the activation or not of the cooking means, to cook part of the pattern or layer deposited, for each of the layers or patterns deposited.

Briefly, the method of the invention comprises the steps of:

attaching one container 20 to the product inlet 17 to deliver a certain dehydrated food material into the processing unit 10;

retrieving the information of the food material on the container 20 and the recipe to adapt process parameters in the processing unit 10 to deliver the hydration level and/or structure and/or texture desired for the food product;

processing the dehydrated material in the unit 10 and delivering at least a layer of it into the depositing area 60.

The method further comprises the step of changing the container 20 to a different one in order to dispense a further layer of the same or of a different food material, this step being repeated one or a plurality of successive times in order to shape on the depositing area 60 the patterns or layers required. Finally, the layers of the product dispensed can be selectively heated and/or cooked by the cooking means.

Although the present invention has been described with reference to preferred embodiments thereof, many modifications and alternations may be made by a person having ordinary skill in the art without departing from the scope of this invention which is defined by the appended claims.

The invention claimed is:

1. A method for operating a food processing system allowing reconstitution and/or structuration and/or texturization of dehydrated food materials, the food processing system comprising a dosing system comprising a single container comprising a food material, the system further comprising a single reconstitution food processing unit to which the single container from the dosing system can be connected, the single reconstitution food processing unit comprising at least one product inlet for the food material coming from the single container, at least one liquid inlet for liquid to be mixed with the food material, and at least one product outlet at one end of the single reconstitution food processing unit for in-line depositing a formed food, the system further comprising a depositing area where the formed food from the single reconstitution food processing unit is dispensed, and the depositing area and the single reconstitution food processing unit being moveable with respect to each other in such a way that different food shapes and/or patterns from one or different food materials can be formed in the depositing area, the method comprising:

attaching the single container to the product inlet to deliver a dehydrated food material into the processing unit;

retrieving information of the dehydrated food material on the single container and a recipe from a database or a control unit to adapt process parameters in the single reconstitution food processing unit to deliver a hydration level and/or food material structure and/or texture desired for a food product;

processing the dehydrated food material in the single reconstitution food processing unit and delivering at least one layer of the food product into the depositing area, the single reconstitution food processing unit in the food processing system is an extrusion unit comprising two parallel screws, the processing the dehydrated food material in the single reconstitution food processing unit comprising (i) mixing the dehydrated food material with the liquid to form a mixture in a conveying and mixing zone of the food processing unit, (ii) subjecting the mixture to a first heating zone of the food processing unit to form a first heated mixture, (iii) subjecting the first heated mixture to a second heating zone of the food processing unit to form a second heated mixture, and (iv) flowing the second heated mixture through a forming area of the food processing unit which cools the second heated mixture and stabilizes a structure thereof; and independently controlling the first and second heating zones.

2. The method according to claim 1 further comprising the step of changing the single container to a different single container in order to dispense a further layer of the food product or of a different food material, this step being repeated one or a plurality of successive times.

3. The method according to claim 1, wherein the at least one layer of the food product dispensed is selectively heated and/or cooked by a cooker.

4. The method according to claim 3, wherein the cooker is attached to the reconstitution food processing unit.

5. The method of claim 4, wherein the heating or cooking by the cooker occurs at the same time as delivering the at least one layer of the food product into the depositing area.

6. The method according to claim 3, wherein the two parallel screws of the extrusion unit are configured to rotate by means of a gear assembly.

7. The method according to claim 1, wherein the food material is a powder.

8. The method according to claim 1 comprising independently controlling a processing speed/rate of the single reconstitution food processing unit, a product flow rate and/or a liquid flow rate in the single reconstitution food processing unit, and a product temperature to generate different hydration levels and/or food material structures and/or textures of a deposited food product.

9. The method according to claim 1 comprising preheating the liquid introduced through the at least one liquid inlet.

10. The method according to claim 1, wherein the single container in the dosing system comprises an identification member with the information on the dehydrated food material delivered to the single reconstitution food processing unit.

11. The method according to claim 1, wherein the extrusion unit comprises a plurality of segments with different profiles designed to achieve different shear generation and/or mixing and/or aeration of the food product flowing through the plurality of segments.

12. The method according to claim 1, wherein the extrusion unit comprises an end segment configured to avoid backflow of the food product.

13. The method according to claim 1, wherein the two parallel screws of the extrusion unit rotate in the same direction.

14. The method according to claim 1, wherein the food processing unit further comprises a first thermal isolating area arranged between the conveying and mixing zone and the first heating zone.

15. The method according to claim 14, wherein the food processing unit further comprises a second thermal isolating area arranged between the first heating zone and the second heating zone.

16. The method according to claim 15, wherein the food processing unit further comprises a third thermal isolating area arranged between the second heating zone and the forming area.

17. The method of claim 1, wherein the single reconstitution food processing unit comprises a second liquid inlet.

18. The method of claim 17 further comprising dispensing a second liquid through the second liquid inlet before flowing the second heated mixture through the forming area.

19. The method of claim 18, wherein the second liquid is a lubricant.

20. The method of claim 1, wherein the first and second heating zones have a temperature up to 240° C.

* * * * *

UNITED STATES PATENT AND TRADEMARK OFFICE
CERTIFICATE OF CORRECTION

PATENT NO. : 11,638,442 B2
APPLICATION NO. : 16/344470
DATED : May 2, 2023
INVENTOR(S) : Youcef Ait Bouziad Page 1 of 1

It is certified that error appears in the above-identified patent and that said Letters Patent is hereby corrected as shown below:

On the Title Page

Item (71) Please change the applicant name from "NESTEC S.A." to "SOCIÉTÉ DES PRODUITS NESTLÉ S.A."

Signed and Sealed this
Eighth Day of August, 2023

Katherine Kelly Vidal
*Director of the United States Patent and Trademark Office*